(12) United States Patent
McCulloch et al.

(10) Patent No.: US 9,063,566 B2
(45) Date of Patent: Jun. 23, 2015

(54) SHARED COLLABORATION USING DISPLAY DEVICE

(75) Inventors: Daniel McCulloch, Kirkland, WA (US);
Stephen Latta, Seattle, WA (US);
Darren Bennett, Seattle, WA (US);
Ryan Hastings, Seattle, WA (US); Jason Scott, Kirkland, WA (US); Relja Markovic, Sunnyvale, CA (US); Kevin Geisner, Mercer Island, WA (US);
Jonathan Steed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 614 days.

(21) Appl. No.: 13/308,350

(22) Filed: Nov. 30, 2011

(65) Prior Publication Data

US 2013/0135180 A1    May 30, 2013

(51) Int. Cl.
*G09G 5/00*     (2006.01)
*G06F 3/01*     (2006.01)
(Continued)

(52) U.S. Cl.
CPC ............... *G06F 3/011* (2013.01); *G06F 3/012* (2013.01); *G06T 19/006* (2013.01); *G02B 27/017* (2013.01); *G02B 2027/014* (2013.01); *G06Q 10/10* (2013.01)

(58) Field of Classification Search
CPC .............. G06F 3/0481; G06F 3/04812; G06F 3/04815; H04N 7/15; G06Q 10/101; G06Q 10/103

USPC ....... 345/7, 8; 359/630; 349/11, 15; 709/204, 709/205, 220, 221
See application file for complete search history.

(56) References Cited

U.S. PATENT DOCUMENTS 6,947,219 B1    9/2005   Ou
7,302,274 B2   11/2007   Makela et al.
(Continued)

FOREIGN PATENT DOCUMENTS

| CN | 1707308 A | 12/2005 |
| JP | 2004287063 A | 10/2004 |
| KR | 1020110070514 A | 6/2011 |

OTHER PUBLICATIONS

International Search Report, Mailed Date: Mar. 12, 2013, Application No. PCT/US2012/066670, Filed Date: Nov. 27, 2012, pp. 9.

(Continued)

*Primary Examiner* — Jennifer Nguyen
(74) *Attorney, Agent, or Firm* — Micah Goldsmith; Judy Yee; Micky Minhas

(57) ABSTRACT

Various embodiments are provided for a shared collaboration system and related methods for enabling an active user to interact with one or more additional users and with collaboration items. In one embodiment a head-mounted display device is operatively connected to a computing device that includes a collaboration engine program. The program receives observation information of a physical space from the head-mounted display device along with a collaboration item. The program visually augments an appearance of the physical space as seen through the head-mounted display device to include an active user collaboration item representation of the collaboration item. The program populates the active user collaboration item representation with additional user collaboration item input from an additional user.

15 Claims, 4 Drawing Sheets

(51) Int. Cl.
*G06T 19/00* (2011.01)
*G02B 27/01* (2006.01)
*G06Q 10/10* (2012.01)

(56) References Cited

U.S. PATENT DOCUMENTS

| | | |
|---|---|---|
| 7,312,766 B1 | 12/2007 | Edwards |
| 7,818,679 B2 | 10/2010 | Clarke |
| 2002/0010734 A1* | 1/2002 | Ebersole et al. ............. 709/201 |
| 2002/0118220 A1* | 8/2002 | Lui et al. ...................... 345/709 |
| 2005/0138566 A1* | 6/2005 | Muller et al. ................. 715/759 |
| 2008/0028300 A1 | 1/2008 | Krieger et al. |
| 2009/0260060 A1 | 10/2009 | Smith et al. |
| 2010/0095198 A1 | 4/2010 | Bultrowicz et al. |
| 2010/0186072 A1* | 7/2010 | Kumar .............................. 726/7 |
| 2010/0318642 A1 | 12/2010 | Dozier |
| 2012/0249741 A1* | 10/2012 | Maciocci et al. ............... 348/46 |

OTHER PUBLICATIONS

Convertino, et al., "Designing Group Annotations and Process Visualizations for Role-Based Collaboration", Retrieved at <<http://citeseerx.ist.psu.edu/viewdoc/download?doi=10.1.1.181.254&rep=rep1&type=pdf>>, First International workshop on Social Computing, Behavioral Modeling, and Prediction SBP, Apr. 1-2, 2008, pp. 197-206.

"How to Get the Best of Both Google Docs and Microsoft Office", Retrieved at <<http://lifehacker.com/5538207/how-to-get-the-best-of-both-google-docs-and-microsoft-office>>, Retrieved Date: Sep. 5, 2011, pp. 5.

State Intellectual Property Office of the People's Republic of China, Office Action Issued in Chinese Patent Application No. 201210500689.5, Apr. 29, 2015, 10 pages.

\* cited by examiner

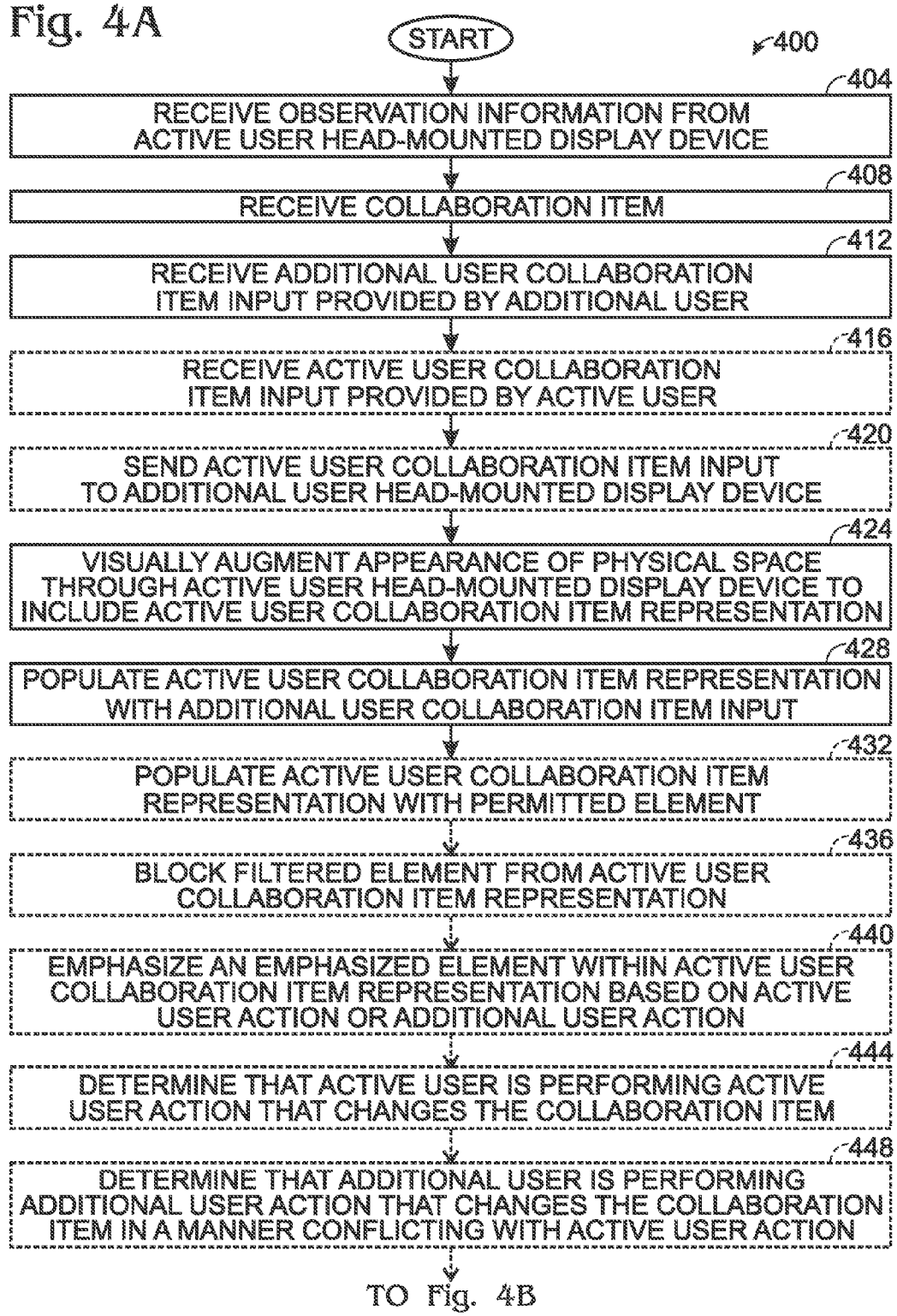

SHARED COLLABORATION USING DISPLAY DEVICE

BACKGROUND

Communication technology advances are making possible increasingly distributed working environments. Groups of individuals working together on a common project may include team members in geographically diverse locations. Such team members often need to collaborate in developing project deliverables, such as documents, reports, proposals, models, etc.

Current collaboration tools include revision control applications and content management systems that track changes made by multiple users within a document or file. Other tools may enable a project team to utilize websites for facilitating the sharing of information among team members. However, current tools generally require team members to provide inputs or changes to a project team document in a serial fashion. Providing and receiving real-time feedback or interaction from other project team members regarding such inputs or changes may be challenging.

Some collaboration tools may allow documents or other materials to be password protected or otherwise made unavailable to certain project team members via directory level access controls. However, such access control measures may inhibit the collaborative creation of documents and other materials having information of various sensitivities. As a result, current tools may result in diminished collaboration effectiveness among project team members.

SUMMARY

To address the above issues, a shared collaboration system and related methods for enabling an active user to interact with an additional user and with a collaboration item are provided. In one example, a head-mounted display device may he operatively connected to a computing device. The head-mounted display device may include a transparent display screen through which the active user may view a physical space.

The shared collaboration system may include a collaboration engine program that is executed by a processor of the computing device. The collaboration engine program may he configured to receive observation information of the physical space from the head-mounted display device. The collaboration engine program may also receive the collaboration item along with additional user collaboration item input from the additional user. The program may visually augment an appearance of the physical space as seen through the transparent display screen of the head-mounted display device to include an active user collaboration item representation of the collaboration item. The program may populate the active user collaboration item representation with the additional user collaboration item input from the additional user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are a flow chart of a method for enabling an active user to interact with an additional user and a collaboration item according to an embodiment of the present disclosure.

DETAILED DESCRIPTION

Figure 1:
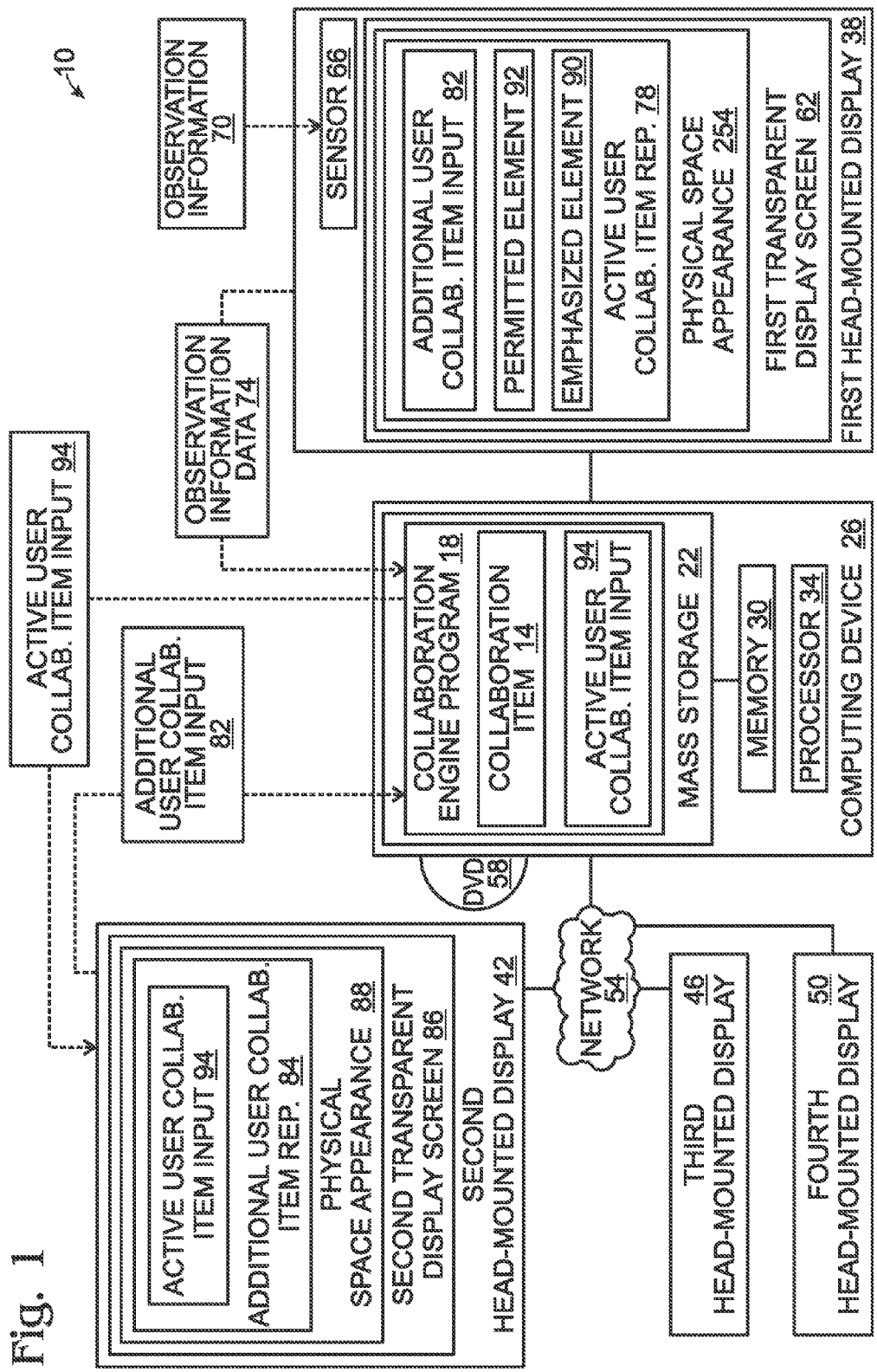
FIG. 1 is a schematic view of a shared collaboration system according to an embodiment of the present disclosure.

FIG. 1 shows a schematic view of one embodiment of a shared collaboration system 10 for enabling a user to interact with one or more additional users and collaboration items, such as collaboration item 14. The shared collaboration system 10 includes a collaboration engine program 18 that may be stored in mass storage 22 of a computing device 26. The collaboration engine program 18 may be loaded into memory 30 and executed by a processor 34 of the computing device 26 to perform one or more of the methods and processes described in more detail below.

The computing device 26 may take the form of a desktop computing device, a mobile computing device such as a laptop, notebook or tablet computer, network computer, home entertainment, computer, interactive television, gaming system, or other suitable type of computing device. Additional details regarding the components and computing aspects of the computing device 26 are described in more detail below.

The computing device 26 may be operatively connected with a first head-mounted display device 38 which is described in more detail below. The computing device 26 may utilize a wired connection to the first head-mounted display device 38, or may employ a wireless connection via WiFi, Bluetooth, or any other suitable wireless communication protocol. The example illustrated in FIG. 1 shows the computing device 26 as a separate component from the first head-mounted display device 38. It will be appreciated that in other examples the computing device 26 may be integrated into the first head-mounted display device 38.

The computing device 26 may be operatively connected also with one or more additional head-mounted display devices, such as second head-mounted display device 42, third head-mounted display device 46 and fourth head-mounted display device 50. The computing device 26 may communicate with the first, second and third head-mounted display devices 42, 46 and 50 via network 54. Network 54 may take the form of a local area network (LAN), wide area network (WAN), wired network, wireless network, personal area network, or a combination thereof, and may include the Internet.

As explained in more detail below, the collaboration item 14 may be any media file, image, object, document, or other item that may be presented in virtual form via one of the head-mounted display devices. The collaboration item 14 may include, for example, text, two-dimensional. and three-dimensional graphics and environments, audio files, video files, image files, emails, presentations, contacts, social graph data, metadata, etc.

In some examples the collaboration item 14 may he received by the computing device 26 from a remote source via network 54, from one or more other input devices operatively connected to the computing device, or from removable computer-readable storage media 58, shown here in the form of a DVD. The removable computer-readable storage media 58 may also take the form of CDs, HD-DVDs, Blu-Ray Discs, EEPROMs, and/or floppy disks, among others. In other examples, the collaboration item 14 may be received from an application that executes on the computing device 26 and generates the collaboration item.

Figure 2:
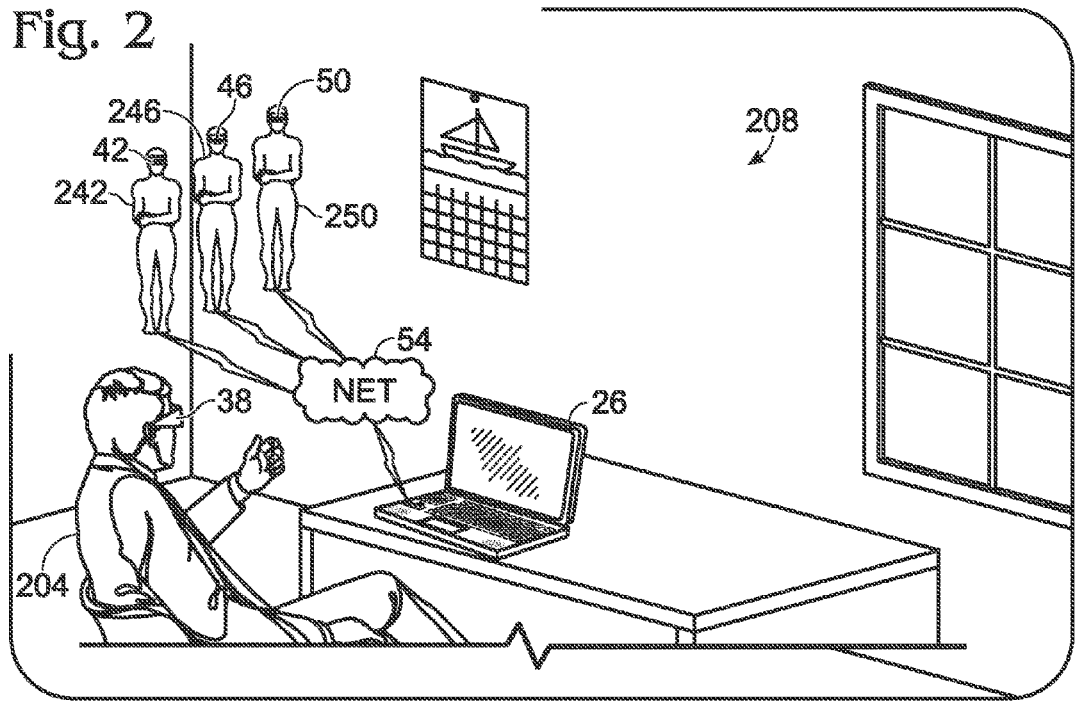
FIG. 2 is a schematic view of an active user in a physical space using the shared collaboration system of FIG. 1 according to an embodiment of the present disclosure.
Figure 3:
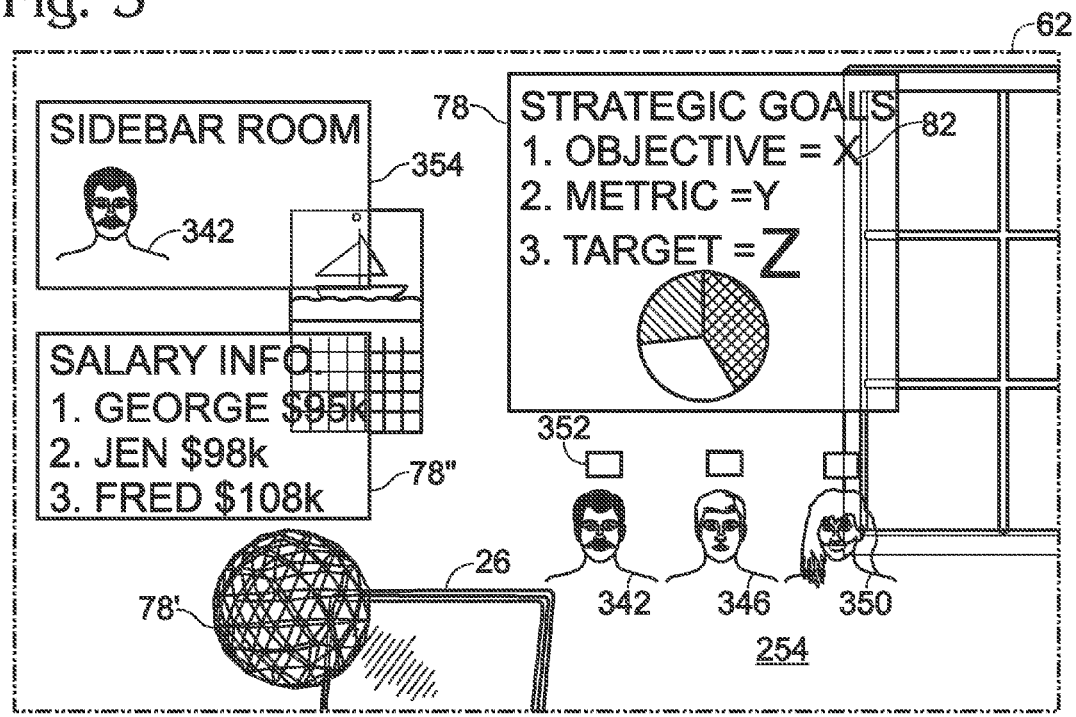
FIG. 3 is a schematic view of the physical space of FIG. 2 as seen through the transparent display screen of the head-mounted display device worn by the active user.

With reference now also to FIGS. 2 and 3, a description of an active user 204 and several additional users 242, 246 and 250 collaborating on a collaboration item 14 via one example of the shared collaboration system 10 will now be provided. FIG. 2 is a schematic view of an active user 204 in a physical space 208, which in this example is an office environment. With reference also to FIG. 1, the active user 204 may wear the first head-mounted display device 38 that includes a first transparent display screen 62 through which the active user may view the physical space 208. The first head-mounted display device 38 may include a sensor 66, such as a video camera, that receives observation information 70 from the physical space 20$ in the form of signals that represent walls, ceilings, floors, objects and other structures or items in the physical space. In other examples, the first lead-mounted display device 38 may also include other input devices, including but not limited to one or more microphones and eye tracking sensors.

The first head-mounted display device 38 may provide observation information data 74 corresponding to the observation information 70 to the computing device 26, shown in FIG. 2 as a laptop computer. Using the observation information data 74, the computing device 26 may create a virtual representation of the physical space 208. As explained in more detail below and with reference to FIG. 3, this virtual representation may be used to create an augmented reality environment in which geometrically located virtual data is positioned within a physical space appearance 254 displayed by the first head-mounted display device 38. The geometrically located virtual data may include representations of one or more collaboration items 14 that are projected onto the transparent display screen 62 of the first head-mounted display device 38. In this manner, the appearance of the physical space 208 as seen through the first transparent display screen 62 of the first head-mounted display device 38 may be augmented to include an active user collaboration item representation 78 corresponding to the collaboration item 14. Additionally, the active user 204 may select or otherwise manipulate geometrically located data and other items, including data and items within the active user collaboration item representation 78, through physical movements or gestures. Such physical movements or gestures may include, but are not limited to, pointing at an item to select or emphasize the item, "grabbing" and moving an item to a different geometric location, "throwing" at item from one collaboration item representation to another collaboration item representation, etc.

As noted above, the collaboration item 14 may include a variety of elements and may take various forms including, but not limited to, two-dimensional and three-dimensional graphics and environments. FIG. 3 includes another example of an active user collaboration item representation 78' that is illustrated as a three-dimensional representation of a sphere.

With continued reference to FIG. 2, the head-mounted display device 38 may be in wireless communication with the laptop computer 26 that is running the collaboration engine program 18. Using the network 54, the laptop computer 26 may also be in communication with second head-mounted display device 42, third head-mounted display device 46 and fourth head-mounted display device 50 that are associated with additional users 242, 246 and 250, respectively. Accordingly, the active user 204 and additional users 242, 246 and 250 may interact in real time via the augmented reality environment described in more detail below, including via audio and/or visual communication.

It will be appreciated that more or less additional users and corresponding head-mounted display devices may be in communication with the laptop computer 26 via the network 54. It will also be appreciated that additional users may be located in the same physical location as the active user 204, or at a location remote from the active user.

With reference now to FIG. 3, a schematic view of an appearance of the physical space 208 of FIG. 2 as seen through the transparent display screen 62 of the first head-mounted display device 38, hereinafter referred to as the physical space appearance 254, will now be described. As explained above, using the observation information data 74 the computing device 26 may create a virtual representation of the physical space 208. This virtual representation may be used to create and position geometrically located data within the physical space appearance 254 as seen by the active user 204.

With reference to FIGS. 1 and 3, the geometrically located data may include an active user collaboration item representation 78 that corresponds to the collaboration item 14. In one example as shown in FIG. 3, the collaboration item 14 may be a word processing document that describes strategic goals of a project team. Members of the project team may include active user 204 and additional users 242, 246 and 250. As described in more detail below, the collaboration engine program 18 may customize the content and/or appearance of the active user collaboration item representation 78 as seen by the active user 204 in a manner that blocks, permits, and/or emphasizes particular data from the collaboration item 14.

The collaboration engine program 18 may enable real time, simultaneous editing of the collaboration item 14 by two or more users. In one example, the collaboration engine program 18 may receive additional user collaboration item input 82 from the second head-mounted display device 42 and/or a corresponding computing device (not shown) associated with the second additional user 242. The additional user collaboration item input 82 may include, for example, one or more edits or modifications to the collaboration item 14 and/or emphasis or highlighting of one or more portions of the collaboration item. In other examples, the additional user collaboration item input 82 may include one or more permissions that relate to one or more portions of the collaboration item, with such permissions providing or denying access to such portions by the active user 204.

With reference now to FIG. 3 and in a more specific example, the additional user collaboration item input 82 may include a modification to the "Objective" element listed in the "Strategic Goals" active user collaboration item representation 78 that corresponds to the collaboration item 14. The additional user collaboration item input 82 may change the "Objective" element to a value of "X". Upon receiving the additional user collaboration item input 82, the collaboration engine program 18 may populate the active user collaboration item representation 78, viewed by the active user 204 on the transparent display screen 62, with "X" for the "Objective". It will be appreciated that this change to the "Objective" element may be presented to the active user 204 substantially in real time, with minimal latency after the additional user 242 has made the modification.

In another example, the collaboration engine program 18 may be configured to visually augment the physical space appearance 254 to include an additional user representation corresponding to one or more of the additional users. As shown in FIG. 3, an additional user representation 342 corresponding to additional user 42, additional user representation 346 corresponding to additional user 246, and additional user representation 350 corresponding to additional user 250 may be provided in the physical space appearance 254. For ease of description, additional user representation 342 will be discussed below. It will be appreciated that the descriptions of additional user representation 342 may apply equally to additional user representations 346 and 350.

The additional user representation 342 may take the form of an icon, symbol, photograph, live video image, or any other suitable image or representation that denotes the additional user 242. The additional user representation 342 may further include an additional user indicator that corresponds to the additional user collaboration item input 82 provided by the additional user 242. In this manner, upon viewing the additional user representation 342 and additional user collaboration item input 82, the active user 204 may easily associate the input with the additional user 42.

As shown in FIG. 3, in one example the additional user indicator may include an indicator element in the form of a floating tag 352 adjacent to the additional user representation 342. The floating tag 352 may have a color, for example kelly green, that matches the color of the additional user collaboration item input 82 as displayed in the active user collaboration item representation 78 (in the example described above, the value "X" for the "Objective"). In another example, the floating tag 352 may be given one or more other distinctive characteristics that visually match one or more characteristics of the additional user collaboration item input 82. Such characteristics may include, but are not limited to, a font, a line width, and an animated appearance.

In another example, the additional user indicator may comprise displaying the additional user representation 342 in a color that matches the color of the additional user collaboration item input 82 as displayed in the active user collaboration item representation 78. In one example, both the additional user representation 342 and the additional user collaboration item input 82 as displayed in the active user collaboration item representation 78 may be displayed in kelly green.

In another example, the active user 204 may desire to locate an additional user who speaks a particular language. In this example, the collaboration engine program 18 may determine that one or more additional users speak the desired language by analyzing profile or other available data regarding the additional users, or by interpreting the language spoken by the additional users during an interaction with the active user 204. Upon identifying an additional user who speaks the desired language, the additional user indicator corresponding to that additional user may be given a distinctive visual characteristic that indicates to the active user 204 that this additional user speaks the desired language.

In one example, the additional user indicator may comprise displaying the floating tag 352 in the form a flag of a country associated with the desired language. In another example, the additional user representation 342 may be displayed in the colors of the flag of a country that is associated with the desired language. In another example, the collaboration engine program 18 may provide to the active user 204 real-time audio translation of voice communication from an additional user from a first language into a desired language.

As noted above, the collaboration engine program 18 enables real time, simultaneous editing of a collaboration item 14 by two or more users. In some examples, a change or edit to the collaboration item 14 that is made by one user may conflict with a change or edit made by another user. In a more specific example, where the "Objective" element in the active user collaboration item representation 78 currently has a value "X", the active user 204 may perform an active user action that changes this value to "A." In contrast, the additional user 242 may perform an additional user action that changes this value to "B." The collaboration engine program 18 may determine that the additional user action conflicts with the active user action. Based on determining this conflict, the collaboration engine program 18 may establish a social connection between the active user 204 and the additional user 242 that enables the users to discuss and potentially resolve their conflicting actions.

In one example, establishing the social connection may include connecting the active user 204 and additional user 242 via live voice or video conferencing via their respective first and second head-mounted display devices 38, 42. With reference to FIG. 3, in another example a sidebar room 354 showing the additional user representation 342 of the additional user 242 may be displayed in the physical space appearance 254 as viewed by the active user 204. The sidebar room 354 may facilitate a live video conference between the active user 204 and the additional user 242.

In another example, the collaboration engine program 18 may allow one user to control who of the additional users, if anyone, may change a collaboration item 14 or certain content in the collaboration item. In this manner, a user may focus on particular content and make changes to the content without receiving input or other changes from other users. Alternatively, a user may grant one or more additional users access rights to the collaboration item 14 or to certain content in the collaboration item.

In a more specific example, where the active user collaboration item 78 is one slide in a slide deck, the collaboration engine program 18 may lock the active user collaboration item slide such that only the active user 204 may modify this slide. One or more of the additional users 242, 246 and 250 may still modify other slides in the slide deck. Additionally, if desired by the active user 204, one or more of the additional users 242, 246 and 250 may view the changes made by the active user to the locked active user collaboration item slide as the changes are being made.

The collaboration engine program 18 may also be configured to emphasize an emphasized element 90 within the active user collaboration item representation 78 based on an active user action or an additional user action. In one example and with reference to FIG. 3, the collaboration engine program 18 may determine that the active user 204 is looking at or otherwise focusing on the value "Z" for the "Target" item in the active user collaboration item representation 78. The collaboration engine program 18 may utilize an eye-tracking component (not shown) in the first head-mounted display device 38 and geometric location data associated with the position of the value "Z" on the transparent display screen 62 to make this determination. The collaboration engine program 18 may then enlarge the image of the value "Z" in the active user collaboration item representation 78 to emphasize this element to the active user 204. It will be appreciated that the collaboration engine program 18 may emphasize the value "Z" in other manners by, for example, highlighting the value image with color or shadow, floating the value image in a three-dimensional manner off a two-dimensional surface of the active user collaboration item representation 78, or by otherwise animating the value image. In another example, upon determining that the active user 204 is focusing on the value "Z", the collaboration engine program 18 may launch a related presentation adjacent to the value image in the active user collaboration item representation 78.

In another example and with reference also to FIG. 1, the collaboration engine program 18 may determine that one or more of the additional users are looking at or otherwise focusing on the value "Z" for the "Target" item in the collaboration item representation as seen by such users through their respective head-mounted display devices. In a more specific example, the collaboration engine program 18 may determine that the additional user 242 is looking at or otherwise focusing on the value "Z" for the "Target" item in an additional user collaboration item representation 84 as seen by the additional user 242 through the second head-mounted display device 42. As with the first head-mounted display device 38, the second head-mounted display device 42 includes a second transparent display screen 86 that provides the additional user 242 with a physical space appearance 88 of a physical space in which the additional user 242 is located.

The additional user collaboration item representation 84 including the value "Z" for the "Target" item may be presented to the additional user 242 on the second transparent display screen 86. Upon determining that the additional user 242 is looking at or otherwise focusing on the value "Z", the collaboration engine program 18 may alert the active user 204 that the additional user 242 is focusing on the value "Z" by emphasizing the value "Z" to the active user 204 via the active user collaboration item representation 78. As shown in FIG. 3, in one example such emphasis may be provided by enlarging the value "Z."

In another example, the collaboration engine program 18 may also be configured to filter the physical space appearance 254 by blocking from the active user collaboration item representation 78 a filtered element. In one example, the active user 204 may configure the collaboration engine program 18 to display only those edits to the strategic goals collaboration item 14 that are provided by the additional user 246. If additional user 242 provides additional user collaboration item input 82 that includes edits to the strategic goals collaboration item 14, the collaboration engine program 18 will block those edits from being displayed in the active user collaboration item representation 78. It will also be appreciated that the collaboration engine program 18 may automatically filter the physical space appearance 254 according to other preferences of the active user 204. For example, the collaboration engine program 18 may use facial recognition technologies, voice recognition technologies, and/or location information of an additional user to identify such additional user, and may then selectively display or block the additional user representation of such user from the physical space appearance 254 according to a preference designated by the active user 204.

In another example, the collaboration engine program 18 may be configured to populate an active user collaboration item representation with a permitted element 92 that the active user 204 has permission to view. The collaboration engine program 18 may also be configured to block from an active user collaboration item representation a filtered element that the active user 204 does not have permission to view.

In one example and with reference to FIG. 3, the physical space appearance 254 may include an additional active user collaboration item representation 78" corresponding to a collaboration item 14 in the form of a salary information document. The salary information document may contain salary information for a first group of employees and a second group of employees. The active user 204 may be a member of the first group of employees that includes George, Jen and Fred. The active user 204 may riot be a member of the second group of employees that includes Ginger and Tony. Thus, the active user 204 may have permission to view the salary information for the first group of employees of which the active user is a member. The active user 204 may not have permission to view the salary information for the second group of employees of which the active user is not a member. Accordingly, the physical space appearance 254 may display an active user collaboration item representation 78" of the salary information document that displays only the salary information of the first group of employees which the active user 204 has permission to view.

One or more of the additional users, such as additional user 242, may have different permissions with respect to the salary information document. Accordingly, a different collaboration item representation having different salary information may be provided to the additional user 242. For example, if the additional user 242 is a member of the second group of employees but not the first group of employees, then the physical space appearance 88 provided to additional user 242 may display an additional user collaboration item representation of the salary information document that displays only the salary information of the second group of employees.

In another example, the floating tag 352 adjacent to the additional user representation 342 in the physical space appearance 254 may indicate one or more permissions held by the additional user 242. For example, and with reference to the example described above regarding the first and second groups of employees and their corresponding salary information, the active user collaboration item representation 78" of the salary information document may display the employee names and associated salaries of the first group in a royal blue color. In contrast, the additional user collaboration item representation displayed in the physical space appearance 88 provided to additional user 242 may display the employee names and associated salaries of the second group in a candy apple red color. As the additional user 242 has permission to view the salary information of only the second group, the floating tag 352 in the physical space appearance 254 may be colored candy apple red to indicate such permission to the active user 204. In this manner, the active user 204 may easily discern that the additional user 242 has permission to view only the second group salary information associated with the candy apple red floating tag 252.

In another example and with reference to FIG. 1, the active user 204 may generate active user collaboration item input 94, such as edits to the strategic goals collaboration item 14. The collaboration engine program 18 may receive such active user collaboration item input 94 from, for example, the first head-mounted display device 38, an application such as a word processing program on the computing device 26, and/or another input device such as a keyboard, touch screen, etc. The collaboration engine program 18 may send the active user collaboration item input 94 to the second head-mounted display device 42 associated with the additional user 242. The active user collaboration item input 94 may be added to the additional user collaboration item representation 84 displayed in the physical space appearance 88 as seen through the second transparent display screen 86 of the second head-mounted display device 42.

Figure 4B:
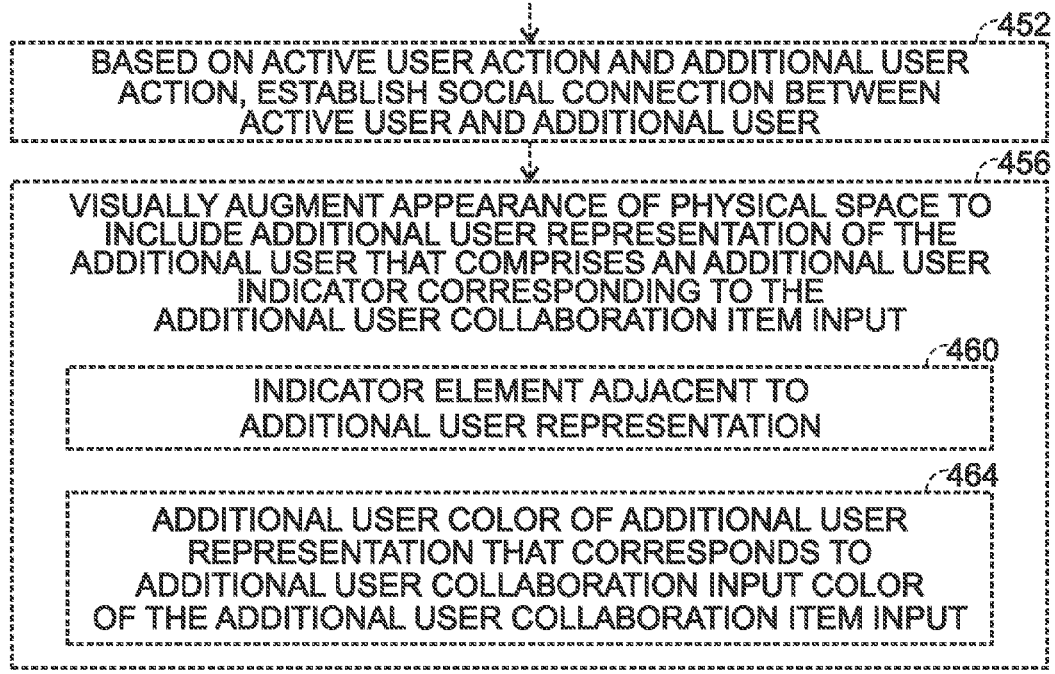

FIGS. 4A and 4B illustrate a flow chart of a method 400 for enabling an active user to interact with an additional user and a collaboration item according to an embodiment of the present disclosure. The following description of method 400 is provided with reference to the software and hardware components of the shared collaboration system 10 described above and shown in FIGS. 1-3. It will be appreciated that method 400 may also be performed in other contexts using other suitable hardware and software components.

With reference to FIG. 4A, at 404 the method 400 includes receiving observation information 70 of the physical space 208 from the first head-mounted display device 38 associated with the active user 204, At 408 the method 400 includes receiving a collaboration item 14. As noted above, the collaboration item 14 may be received from a remote source via network 54, from removable computer-readable storage media 58, from an application that executes on the computing device 26 to generate the collaboration item 14, etc.

At 412 the method 400 includes receiving additional user collaboration item input 82 provided by the additional user 242. At 416 the method may optionally include receiving active user collaboration item input 94 provided by active user 204. At 420 the method 400 may also optionally include sending the active user collaboration item input 94 to the second head-mounted display device 42 associated with the additional user 242.

At 424 the method 400 includes visually augmenting the physical space appearance 254 as seen through the first head-mounted display device 38 to include the active user collaboration item representation 78, such as a representation of the strategic goals document shown in FIG. 2. At 428 the method 400 includes populating the active user collaboration item representation 78 with the additional user collaboration item input 82.

At 432 the method 400 optionally includes populating the active user collaboration item representation 78 with a permitted element 92 that the active user 204 has permission to view. At 436 the method also optionally includes blocking a filtered element from the active user collaboration item representation 78.

At 440 the method 400 optionally includes emphasizing an emphasized element 90 within the active user collaboration item representation 78 based on an active user action or an additional user action. At 444 the method 400 also optionally includes determining that the active user 204 is performing an active user action that changes the collaboration item 14. In such case, at 448 the method 400 may include determining that the additional user 242 is performing an additional user action that changes the collaboration item 14 in a manner that conflicts with the change resulting from the active user action. With reference now to FIG. 4B, at 452 and based on the active user action and the additional user action, the method 400 includes establishing a social connection between active user 204 and additional user 242. As described above, such a social connection may facilitate the active user 204 and additional user 242 resolving the conflict between their changes.

At 456 the method 400 may optionally include visually augmenting the physical space appearance 254 to include an additional user representation 342 of the additional user 242 that comprises an additional user indicator that corresponds to the additional user collaboration item input 82. At 460 the additional user indicator may optionally take the form of an indicator element, such as floating tag 352, adjacent to additional user representation 342. At 464 the additional user indicator may optionally take the form of an additional user color of the additional user representation that corresponds to an additional user collaboration input color of the additional user collaboration item input.

Figure 5:
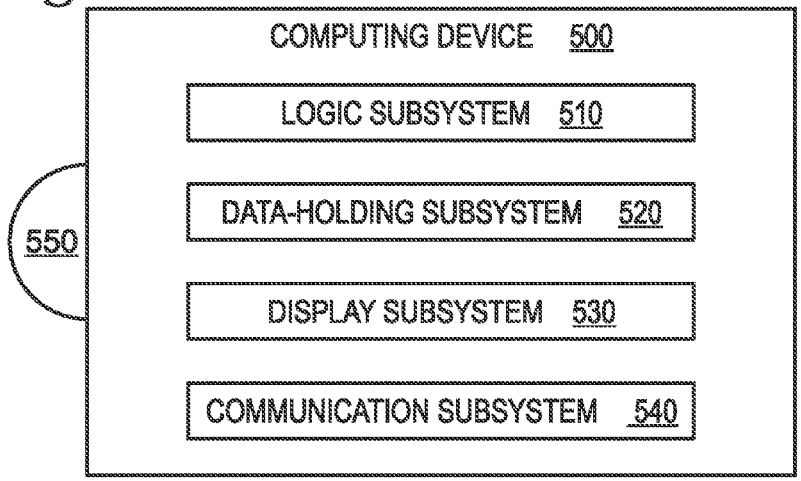
FIG. 5 is a simplified schematic illustration of an embodiment of a computing device.

FIG. 5 schematically illustrates a nonlimiting embodiment of a computing device 500 that may perform one or more of the above described methods and processes. Computing device 500 is shown in simplified form. It is to be understood that virtually any computer architecture may he used without departing from the scope of this disclosure. In different embodiments, computing device 500 may take the form of a desktop computing device, a mobile computing device such as a laptop, notebook or tablet computer, network computer, home entertainment computer, interactive television, gaming system, etc. Further, in some embodiments the methods and processes described herein may he implemented as a computer application, computer service, computer API, computer library, and/or other computer program product in a computing system that includes one or more computers.

As shown in FIG. 5, computing device 500 includes a logic subsystem 510, a data-holding subsystem 520, a display subsystem 530, and a communication subsystem 540. Computing device 500 may optionally include other subsystems and components not shown in FIG. 5. In addition to head-mounted display devices, computing device 500 may also optionally include user input, devices such as keyboards, mice, game controllers, cameras, microphones, and/or touch screens, for example.

Logic subsystem 510 may include one or more physical devices configured to execute one or more instructions. For example, the logic subsystem may be configured to execute one or more instructions that are part of one or more applications, services, programs, routines, libraries, objects, components, data structures, or other logical constructs, Such instructions may be implemented to perform a task, implement a data type, transform the state of one or more devices, or otherwise arrive at a desired result.

The logic subsystem 510 may include one or more processors that are configured to execute software instructions. Additionally or alternatively, the logic subsystem 510 may include one or more hardware or firmware logic machines configured to execute hardware or firmware instructions. Processors of the logic subsystem 510 may be single core or multicore, and the programs executed thereon may be configured for parallel or distributed processing. Processors may optionally include individual components that are distributed throughout two or more devices that may be remotely located and/or configured for coordinated processing. One or more aspects of the processors may be virtualized and executed by remotely accessible networked computing devices configured in a cloud computing configuration.

Data-holding subsystem 520 may include one or more physical, non-transitory devices configured to hold data and/or instructions executable by the logic subsystem 510 to implement the methods and processes described herein. When such methods and processes are implemented, the state of data-holding subsystem 520 may be transformed (e.g., to hold different data).

Data-holding subsystem 520 may include removable media and/or built-in devices, Data-holding subsystem 520 may include optical. memory devices (e.g., CD, DIM, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 520 may include devices with one or more of the following characteristics: volatile, nonvolatile, dynamic, static, read/write, read-only, random access, sequential access, location addressable, file addressable, and content addressable. In some embodiments, logic subsystem 510 and data-holding subsystem 520 may be integrated into one or more common devices, such as an application specific integrated circuit or a system on a chip.

FIG. 5 also shows an aspect of the data-holding subsystem 520 in the form of removable computer-readable storage media 550, which may be used to store and/or transfer data and/or instructions executable to implement the methods and processes described herein. Removable computer-readable storage media 550 may take the form of the DVD 58 illustrated in FIG. 1, CDs, HD-DVDs, Blu-Ray Discs, EEPROMs, and/or floppy disks, among others.

It is to be appreciated that data-holding subsystem 520 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 530 includes one or more image display systems, such as the first head-mounted display device 38, configured to present a visual representation of data held by data-holding subsystem 520. As the methods and processes described herein change the data held by the data-holding subsystem 520, and thus transform the state of the data-holding subsystem, the state of display subsystem 530 may likewise be transformed to visually represent changes in the underlying data.

Communication subsystem 540 may be configured to communicatively couple computing device 500 with one or more networks and/or one or more other computing devices. Communication subsystem 540 may include wired and/or wireless communication devices compatible with one or more different communication protocols. As nonlimiting examples, communication subsystem 540 may be configured for communication via a wireless telephone network, a wireless local area network, a wired local area network, a wireless wide area network, a wired wide area network, etc. In some embodiments, communication subsystem 540 may allow computing device 26 to send and/or receive messages to and/or from other devices via a network such as the Internet.

The term "program" may be used to describe an aspect of the shared collaboration system 10 that is implemented to perform one or more particular functions. In some cases, such a program may be instantiated via logic subsystem 510 executing instructions held by data-holding subsystem 520. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted, Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A shared collaboration system including a head-mounted display device operatively connected to a computing device, the head-mounted display device including a transparent display screen through which an active user may view a physical space, the shared collaboration system enabling the active user to interact with at least one additional user and with at least one collaboration item, the shared collaboration system comprising:
    a collaboration engine program executed by a processor of the computing device, the collaboration engine program configured to:
        receive observation information data representing the physical space from the head-mounted display device;
        receive the at least one collaboration item;
        receive additional user collaboration item input from the at least one additional user;
        visually augment an appearance of the physical space as seen through the transparent display screen of the head-mounted display device to include an active user collaboration item representation;
        visually emphasize an emphasized element within the active user collaboration item representation based on an active user action or an additional user action;
        populate the active user collaboration item representation with the additional user collaboration item input from the at least one additional user;
        determine that the active user is performing an active user action that changes the at least one collaboration item;
        determine that the at least one additional user is performing an additional user action that changes the at least one collaboration item in a manner conflicting with the active user action; and
        based on the active user action and the additional user action, establish a social connection between the active user and the at least one additional user.

2. The shared collaboration system of claim 1, wherein the collaboration engine program is further configured to populate the active user collaboration item representation with a permitted element that the active user has permission to view.

3. The shared collaboration system of claim 1, wherein the collaboration engine program is further configured to block from the active user collaboration item representation a filtered element that the active user does not have permission to view.

4. The shared collaboration system of claim 1, wherein the collaboration engine program is further configured to block from the active user collaboration item representation a filtered element that has been filtered by the collaboration engine program.

5. The shared collaboration system of claim 1, wherein the collaboration engine program is further configured to:
    visually augment the appearance of the physical space as seen through the transparent display screen of the head-mounted display device to include an additional user representation of the at least one additional user that comprises an additional user indicator corresponding to the additional user collaboration item input.

6. The shared collaboration system of claim 5, wherein the additional user indicator comprises an indicator element adjacent to the additional user representation.

7. The shared collaboration system of claim 5, wherein the additional user indicator comprises an additional user color of the additional user representation that corresponds to an additional user collaboration input color of the additional user collaboration item input.

8. A method for enabling an active user to interact with at least one additional user and at least one collaboration item, comprising:
    receiving observation information data representing a physical space from a head-mounted display device;
    receiving at least one collaboration item;

receiving additional user collaboration item input from the at least one additional user;

visually augmenting an appearance of the physical space as seen through a transparent display screen of the head-mounted display device to include an active user collaboration item representation;

visually emphasizing an emphasized element within the active user collaboration item representation based on an active user action or an additional user action;

populating the active user collaboration item representation with the additional user collaboration item input from the at least one additional user;

determining that the active user is performing an active user action that changes the at least one collaboration item;

determining that the at least one additional user is performing an additional user action that changes the at least one collaboration item in a manner conflicting with the active user action; and based on the active user action and the additional user action, establishing a social connection between the active user and the at least one additional user.

9. The method of claim 8, wherein the head-mounted display device is a first head-mounted display device, the at least one additional user having a second head-mounted display device, and the method further comprising:

receiving active user collaboration item input provided by the active user;

sending the active user collaboration item input to the second head-mounted display device for display within an additional user collaboration item representation.

10. The method of claim 8, further comprising populating the active user collaboration item representation with a permitted element that the active user has permission to view.

11. The method of claim 8, further comprising blocking from the active user collaboration item representation a filtered element that the active user does not have permission to view.

12. The method of claim 8, further comprising:

visually augmenting the appearance of the physical space as seen through the transparent display screen of the head-mounted display device to include an additional user representation of the at least one additional user that comprises an additional user indicator corresponding to the additional user collaboration item input.

13. The method of claim 12, wherein the additional user indicator comprises an indicator element adjacent to the additional user representation.

14. The method of claim 12, wherein the additional user indicator comprises an additional user color of the additional user representation that corresponds to an additional user collaboration item input color of the additional user collaboration item input.

15. A computer-readable storage medium comprising instructions stored thereon and executable by a computing device to enable an active user to interact with at least one additional user and at least one collaboration item, the instructions being executable to:

receive observation information data representing a physical space from a head-mounted display device;

receive the at least one collaboration item;

receive additional user collaboration item input from the at least one additional user;

visually augment an appearance of the physical space as seen through a transparent display screen of the head-mounted display device to include an active user collaboration item representation;

populate the active user collaboration item representation with the additional user collaboration item input from the at least one additional user;

visually emphasize an emphasized element within the active user collaboration item representation based on an active user action or an additional user action;

visually augment the appearance of the physical space as seen through the transparent display screen of the head-mounted display device to include an additional user representation of the at least one additional user that comprises an additional user indicator corresponding to the additional user collaboration item input;

determine that the active user is performing an active user action that changes the at least one collaboration item;

determine that the at least one additional user is performing an additional user action that changes the at least one collaboration item in a manner conflicting with the active user action; and based on the active user action and the additional user action, establish a social connection between the active user and the at least one additional user.

\* \* \* \* \*